(12) United States Patent
Antoine et al.

(10) Patent No.: US 6,684,163 B2
(45) Date of Patent: Jan. 27, 2004

(54) DETERMINATION OF A DEGRADATION OF A GAS TURBINE

(75) Inventors: Marc Antoine, Gretzenbach (CH); Patrick Escher, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 10/072,989

(22) Filed: Feb. 12, 2002

(65) Prior Publication Data

US 2002/0143477 A1 Oct. 3, 2002

(30) Foreign Application Priority Data

Feb. 19, 2001 (EP) .............................. 01810172

(51) Int. Cl.[7] ............................ G05B 9/02; F01D 17/20
(52) U.S. Cl. .............................. 702/34; 702/82; 700/30
(58) Field of Search ...................... 702/34, 82; 714/737; 700/30

(56) References Cited

FOREIGN PATENT DOCUMENTS

| EP | 1096122 | 5/2001 |
|---|---|---|
| WO | WO99/64736 | 12/1999 |

OTHER PUBLICATIONS

Patton, et al., "Robust Fault Detection of Jet Engine Sensor Systems Using Eigenstructure Assignment", Journal of Guidance, Control and Dynamics 15 (1992) Nov./Dec., No. 6, Washington, D.C., USA, pp. 1491–1497.

Escher, et al., "An Object–Orientated Diagnostics Computer Program Suitable for Industrial Gas Turbines", CIMAC Conference presentation, Interlaken, Switzerland, May 15–18, 1995.

*Primary Examiner*—Kamini Shah
(74) *Attorney, Agent, or Firm*—Burns, Doane, Swecker & Mathis, L.L.P.

(57) ABSTRACT

A degradation state of the gas turbine is repeatedly estimated with the aid of a set of measured values, at least one of the measured values not being taken into account in each case during the estimation. A deviating estimate which deviates substantially from the remaining estimates or from an estimate which takes account of all the measured values implies that a measured value which has not been taken into account for this deviating estimate is defective.

This renders it possible to distinguish in a simple way between changes in state and measuring errors. In the case of a method for determining a degradation of a gas turbine which is being implemented in any case, the determination of defective sensors according to the invention is possible with a low programming outlay and without assumptions concerning a response of individual sensors.

9 Claims, 2 Drawing Sheets ent of a Degradation of
a Gas Turbine

FIELD OF THE INVENTION

The invention relates to the field of control and instrumentation technology for gas turbines. It relates to a method and a computer program product for determining a degradation of a gas turbine.

BACKGROUND OF THE INVENTION

Such a method for determining a degradation of a gas turbine is known, for example, from "An Object-Oriented Diagnostic Computer Program Suitable for Industrial Gas Turbines", P.C. Escher et al., CIMAC Conference, Interlaken, Switzerland, May 15–18, 1995, the content of which is hereby incorporated in the application. In this method, a degradation state of a gas turbine is determined with the aid of measurements during operation of the gas turbine. The method, termed GPA ("Gas Path Analysis"), uses a mathematical simulation or a model of a thermodynamic and aerodynamic operating behavior of the gas turbine. The model permits values of measurable output variables to be determined from input variables such as, for example, air inlet temperature and pressure, as well as from assumptions concerning state parameters. Such output variables are, for example, pressures, mass flows and temperatures at various points in the gas path of the gas turbine, a fuel mass flow, a rotational speed and an output mechanical power. Individual state parameters represent a degradation state of respectively one component of the gas turbine, for example a contamination of compressor blades and a reduction in swallowing capacity of the compressor, erosion of turbine blades or corrosion of machine parts.

In order to be able to plan maintenance of the gas turbine, it is of interest to know as early as during the operation of the gas turbine the state in which the individual components are to be found. Since the state parameters are not measurable, they are deduced with the aid of measured values of the measurable output variables and with the aid of the model.

The problem arises in this case that sensors can be defective and can supply wrong measured values. The estimated state parameters are also falsified thereby, and it is not immediately evident whether a variation of measured values is to be ascribed to a change in the state or a falsification of the measured values by a defective sensor. The existing methods (for example method of least squares) have the disadvantage that either redundant sensors must be used or that the possibility of detecting a sensor defect is limited by the lack of knowledge of the observed process, and this is attended by a high outlay on engineering.

SUMMARY OF THE INVENTION

It is therefore an object of the invention to create a method and a computer program product for determining a degradation of a gas turbine of the type mentioned at the beginning which permit simple determination of defective measured values and sensors.

Thus, according to the invention a degradation state of the gas turbine is repeatedly estimated with the aid of a set of measured values, at least one of the measured values not being taken into account in each case during the estimation. A deviating estimate which deviates substantially from the remaining estimates or from an estimate which takes account of all the measured values implies that a measured value which has not been taken into account for this deviating estimate is defective.

This renders it possible to distinguish in a simple way between changes in state and measuring errors. In the case of a GPA method for determining a degradation of a gas turbine which is being implemented in any case, the determination of defective sensors according to the invention is possible with a low programming outlay and without assumptions concerning a response of individual sensors.

A further advantage is that the method uses a large quantity of information, that is to say data from a plurality of sensors and information concerning a response of the gas turbine. This raises the quality of the method by contrast with methods which judge a sensor in isolation, that is to say only with the aid of its own measured values.

BRIEF DESCRIPTION OF THE DRAWINGS

The subject matter of the invention is explained in more detail below with the aid of a preferred exemplary embodiment which is illustrated in FIG. 1.

DETAILED DESCRIPTION OF THE INVENTION

Figure 1:
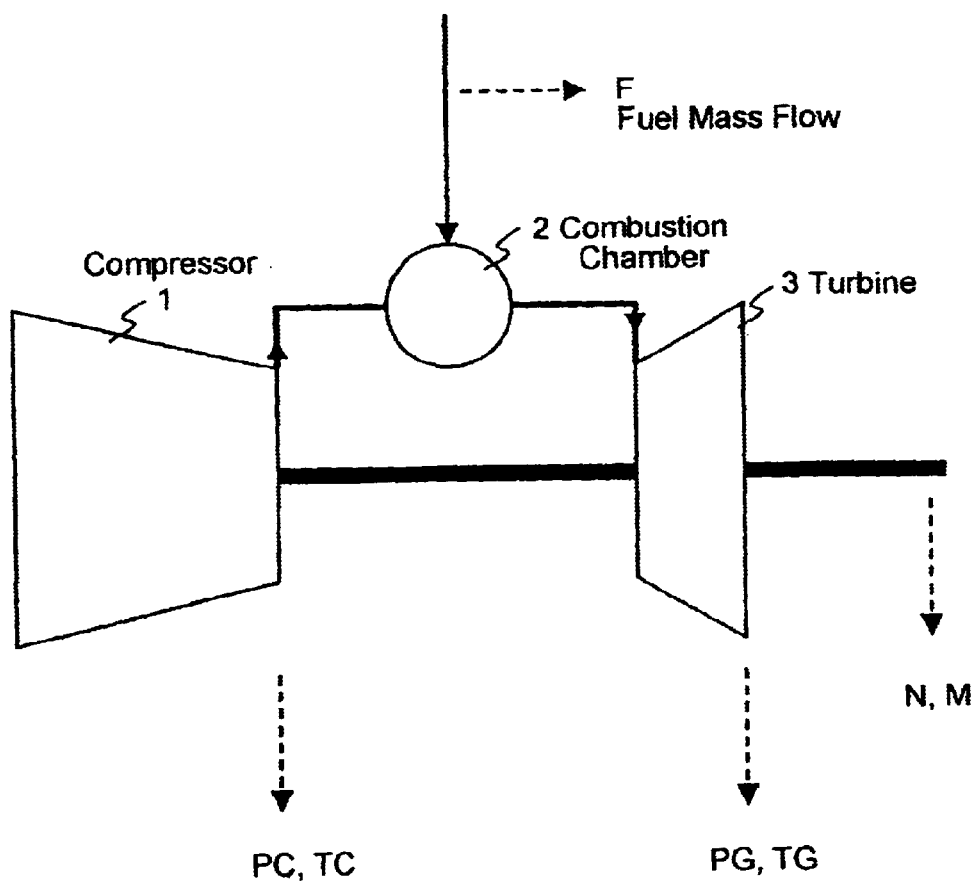
FIG. 1 shows a schematic of a design of a gas turbine with associated measured variables. The reference symbols used in FIG. 1 and their meanings are summarized in the list of reference symbols.

The figure shows a schematic of a design of a gas turbine with associated measured variables. A compressor 1 compresses air which is mixed with fuel in a combustion chamber 2. The mixture is combusted and a turbine 3 is driven as a result. The turbine 3 and compressor 1 have a common rotor shaft. An outlet pressure PC and an outlet temperature TC are measured at the compressor, and an exhaust pressure PG and an exhaust temperature TG are likewise measured at the turbine 3. Further measured variables are a rotational speed N of the rotor shaft, a mechanical torque which can be used by the rotor shaft, or a transmitted shaft output M, and a fuel mass flow F.

Further variables are measured in a preferred embodiment of the invention. In particular, in the case of a two-stage gas turbine at least one exhaust pressure and one exhaust temperature of a further turbine, which is connected downstream of the turbine 3 and a further combustion chamber, are measured.

Measured values are detected at a specific measuring instant, that is to say the above-named measured variables are detected by means of a plurality of suitable sensors and, if appropriate, conditioned, for example by filtering a temporal sequence of sensor values, or by averaging sensor values of a plurality of redundant sensors. As a result, a measured value is assigned to each sensor for the measuring instant and is transmitted to a data processing unit. The measured values for a specific measuring instant form a set or vector $y=(Y_1, Y_2, \ldots y_n)$ of measured values, n being the number of measured values.

In accordance with the method, mentioned at the beginning, of gas path analysis (GPA), there is a mathematical simulation model of the thermodynamic and aerodynamic operating behavior of the gas turbine. The model is preferably structured on the basis of a physical modeling of the gas turbine, preferably on the basis of mass balances and energy balances, and adapted on the basis of measurements to a specific concrete gas turbine. It suffices for the purposes of the present invention to consider the model as a function y=f(x) which uniquely assigns a set of measured values y to a state vector x. The state vector x=($x_1, x_2, \ldots x_m$) contains m state parameters which in each case represent a degradation state of a component of the gas turbine. In general, the function is nonlinear and m<n. The calculated measured values are also partly dependent on measured input variables of the gas turbine such as, for example, air inlet temperature and air inlet pressure. These input variables are considered as parameters of the model in connection with the present invention.

During operation of the gas turbine, the rotational speed N or an output mechanical power of the gas turbine is controlled, for example. An operating state is set up by this control. For example, assigned nominal values for the fuel mass flow F and the pressures and temperatures at various measuring points of the gas turbine are yielded for a new gas turbine in the case of a prescribed nominal power and rotational speed. Corresponding to these values is a nominal state of the gas turbine which is represented, for example, by a compressor efficiency, a turbine efficiency, a compressor mass flow and a turbine mass flow.

If the gas turbine is degraded in the course of time by contamination, erosion and corrosion, the rotational speed and power, for example, are kept at assigned desired values by the control. However, for example, in this case the worsened levels of efficiency lead to a rise in the fuel mass flow and a drop in pressures at the outlet of the compressor. The remaining measured values vary correspondingly. These changes are an effect of the worsened state x of the gas turbine, which is determined by means of the GPA. If, for example, the rotational speed is controlled, it supplies no information and cannot be used in the method according to the invention.

The model is used to calculate the degradation state x of the gas turbine or its components from measured values y. Thus, a state x is searched for which corresponds as well as possible to a given set of measured values y=f(x). Since generally m<n, the state x is overdetermined and there is a need for a compensation calculation in order, if appropriate, to compensate inconsistencies between the measured values y. The function f is generally not invertible in a closed fashion, so that the state x is preferably determined iteratively using a numerical method, for example using a multidimensional variant of the Newton-Raphson method.

In a linear variant of the GPA method, the function f is linearized at the nominal operating point, that is to say a Jacobi matrix J is determined for a nominal state $x_0$ with assigned nominal measured values $y_0$=f($x_0$), such that $$dy = J\, dx$$

holds for a small deviation dx of the state x from the nominal state $x_0$ and a corresponding deviation dy of the measured values y from the nominal measured values $y_0$. In order in this case to determine for given measured values y the associated state x, an inverse $J^{-1}$ of the Jacobi matrix J is determined. Since it holds in general that m<n, that is to say more measured values than states are present, the inverse $J^{-1}$ is formed as a generalized inverse or pseudo-inverse. It follows that $$x = x_0 + J^{-1}(y - y_0).$$

In a nonlinear variant of the GPA method, which yields more accurate values for greater deviations from the nominal operating point, starting from the nominal operating point a numerical method is used to determine iteratively that state deviation dx which corresponds to an existing measured value deviation dy. In this case, the starting point in each iteration step is preferably an estimated state, and a Jacobi matrix and the corresponding measured values in this state are calculated with the aid of the function f. A deviation of these calculated measured values from the measured measured values is multiplied by the inverse Jacobi matrix, and the estimated state is corrected in accordance with this product. The corrected state serves as estimated state for a next iteration step.

If there are now defective measured values present, for example because of a defective or drifting sensor or because data processing or transmission has been disturbed, these lead as a result of the abovementioned compensation calculation to a variation in a state x estimated by means of GPA or in an estimated state deviation dx from the nominal state x0. This variation is to be distinguished from an actual change in the degradation state of the gas turbine.

In accordance with the invention, a plurality of subsets or reduced measured value vectors yr(k) of the set of measured values are formed for this determination of a defective measured value. In this case, at least one index k of a subset denotes those measured values which are not contained in the subset. For example, in the case of a set or vector of measured values y=(PC,TC,PG,TG,F,M) the possible subsets for which exactly one measured value is omitted cyclically in each case are yr(PC)=(TC,PG,TG,F,M),
yr(TC)=(PC,PG,TG,F,M),
yr(PG)=(PC,TC,TG,F,M),
yr(TG)=(PC,TC,PG,F,M),
yr(F)=(PC,TC,PG,TG,M),
yr(N)=(PC,TC,PG,TG,F).

Similar to these are subsets for which exactly two measured values are omitted, namely yr(PC,TC)=(PG,TG,F,M),
yr(PC,PG)=(TC,TG,F,M),
yr(PC,TG)=(TC,PG,F,M),
... etc.

Since the state values are overdetermined for given measured values, it is also possible to calculate a state vector with the aid of reduced measured value vectors yr(k). The structure of the modeling equations determines how many and which measured values still suffice in a given case for uniquely determining the state. For example, TC, PC, TG, PG and M are measured. If both a contamination of the compressor and an erosion of the turbine are present, it is possible to determine therefrom four state values, specifically respectively the mass flow and the efficiency of the compressor and the turbine. If respectively exactly one of the measurements is ignored cyclically, various state values can be calculated reliably from the corresponding reduced measured value vectors depending on the modeling.

In accordance with the linear GPA method, the associated state x is to be determined in the case of a given reduced measured value vector yr(k) or a corresponding reduced vector dyr(k) of deviations of the measured values. A reduced inverse $Jr(k)^{-1}$ of a reduced Jacobi matrix Jr(k) is determined for this purpose. The reduced Jacobi matrix Jr(k) is produced by deleting at least one of the rows of the Jacobi matrix J, which corresponds or correspond to the at least one non-considered measured value with index k, such that, therefore $$dyr(k)=Jr(k)\,dx.$$

As long as m=<n and the rank of Jr(k) is at least m, the reduced inverse Jr(k)$^{-1}$ exists as a generalized inverse or pseudo-inverse, and $$dx(k)=Jr(k)^{-1}dyr(k),$$

or $$x(k)=x0+Jr(k)^{-1}\,(yr(k)-y0r(k)).$$

Here, x(k) and dx(k) are respectively the estimated state and the estimated deviation of the state from the nominal state, which do not take account of the measurement k. It is to be noted in this case that x(k) and dx(k) have the same number of elements as x and dx, respectively.

In a similar way, the above-described nonlinear GPA method is applied using reduced measured value vectors and Jacobi matrices.

In order to determine defective measured values and/or sensors, a state vector is calculated for each of the subsets and assigned to this subset. Each measured value is assigned those subsets which do not include the measured value. In accordance with the above example, the sets yr(PC)=(TC, PG,TG,F,N) and yr(PC,TC)=(PG,TG,F,N) and, possibly, further sets are assigned to the measured value PC. The state vectors which are assigned to the subsets which are assigned to a measured value are also assigned to this measured value.

Each measured value is therefore assigned at least one state vector. A plurality of state vectors are assigned to the measured value for the case in which a plurality of subsets exist which do not include the measured value of the sensor.

A measured value whose assigned state vector or assigned state vectors deviates/deviate substantially from the assigned state vectors of the other measured values is diagnosed as defective. In an advantageous variant of the invention, a measured value whose state vector or assigned state vectors deviates/deviate substantially from a state vector which takes account of all the measured values is diagnosed as defective. It is assumed in both cases that if a measurement is defective the at least one assigned state vector, which does not, after all, take account precisely of this measurement, best describes the actual state of the machine. All other estimated state vectors include the defective measurement and therefore deviate from the actual state. The at least one state vector assigned to the measured value therefore deviates substantially from those state vectors which take account of this measured value.

In a further advantageous variant of the invention, this deviation is determined by considering the deviation of the state vectors from the nominal state $x_0$. In this case, dx is the estimated deviation of the state vector from the nominal state which takes account of all the measurements, and dx(k) is the estimated deviation of the state from the nominal state which does not take account of the measurement k. $dx_i$ and $dx_i(k)$ are respectively the ith element of the corresponding vector. If measurements are always ignored only individually, each measurement is assigned exactly one vector dx(k). One measure $Q_k$ of the quality of this measurement is then $$Q_k = \frac{1}{m}\sum_{i=1}^{m}\frac{\mathrm{abs}(dx_i - dx_i(k))}{dx_i(k)}.$$

A measurement is preferably diagnosed as defective when its measure of quality is greater than at least approximately 30%.

In another variant of the invention, a further measure of quality is $$Q_k = \frac{1}{m-1}\sum_{i=1}^{m-1}\frac{\mathrm{abs}\lfloor\arctan(dx_{i+1} - dx_i) - \arctan(dx_{i+1}(k) - dx_i(k))\rfloor}{\pi},$$

the arctan function being calculated in radians. A measurement is preferably diagnosed as defective when this further measure of quality becomes greater than at least approximately 5%, 10% or 30%.

In a preferred variant of the inventive method, defective measured values and defective sensors are displayed to a user by means of an operator interface of a control system of the gas turbine, and/or defective measured values in the control system are marked as defective and not taken into account.

Figure 2:
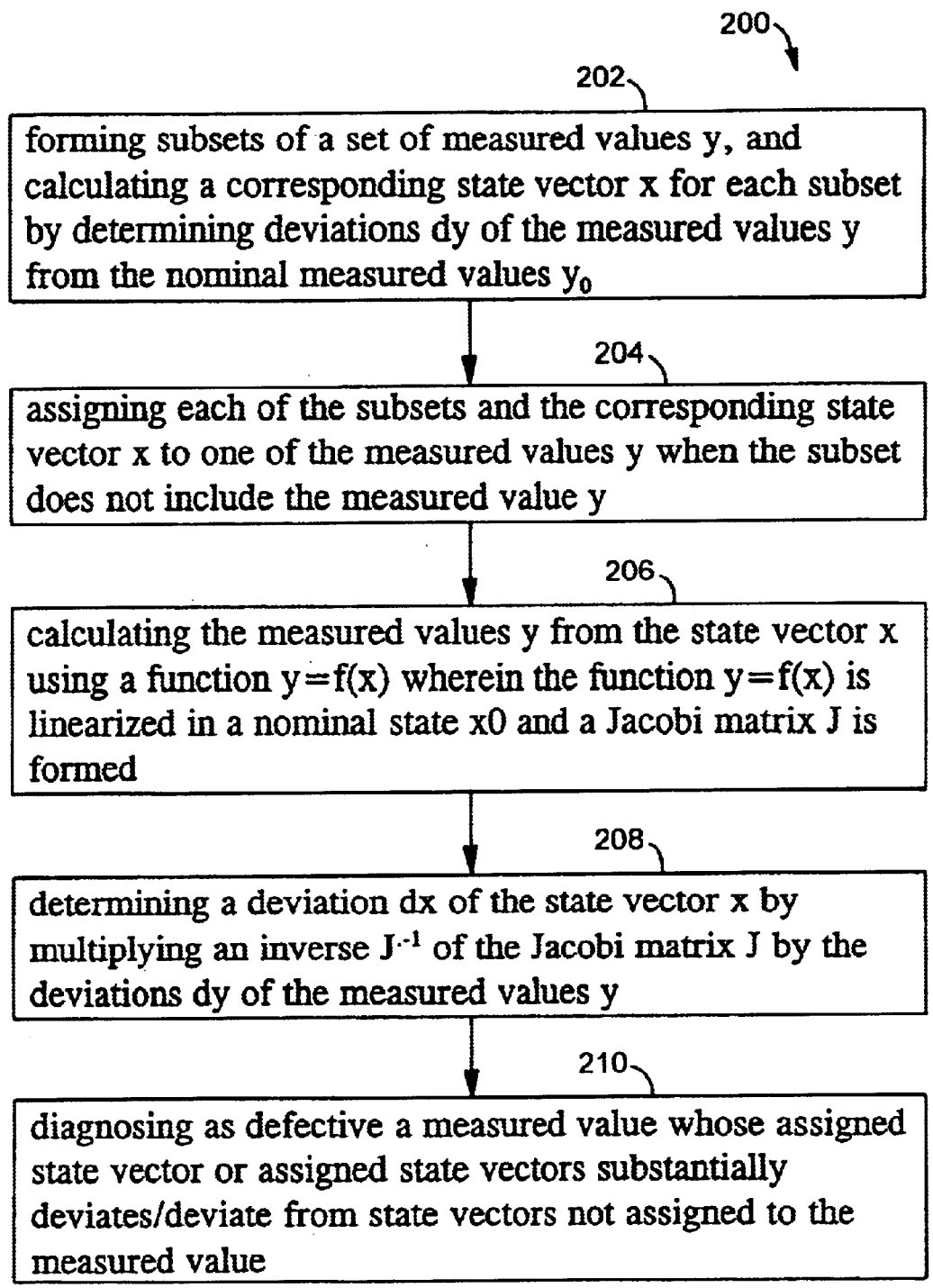
FIG. 2 shows a flow diagram in accordance with an exemplary embodiment of the invention.

FIG. 2 shows a flow diagram 200 including blocks 202–210, in accordance with an exemplary embodiment of the invention. As shown in FIG. 2, the block 202 includes forming subsets of a set of measured values y, and calculating a corresponding state vector x for each subset by determining deviations dy of the measured values y from the nominal measured values $y_0$. The block 204 includes assigning each of the subsets and the corresponding state vector x to one or more of the measured values y when the subset does not include the one or more measured value(s) y. The block 206 includes calculating the measured values y from the state vector x using a function y=f(x) wherein the function y=f(x) is linearized in a nominal state x0 and a Jacobi matrix J is formed. The block 208 includes determining a deviation dx of the state vector x by multiplying an inverse J$^{-1}$ of the Jacobi matrix J by the deviations dy of the measured values y. The block 210 includes diagnosing as defective a measured value whose assigned state vector or assigned state vectors substantially deviates/deviate from state vectors not assigned to the measured value.

A computer program product in accordance with the invention comprises computer program coding means which are preferably stored on a computer-readable medium, and which are suitable for executing the method in accordance with the invention in the case of execution on a computer.

The invention can be executed using an essentially arbitrary number of sensors or measured values if these measured values can be taken into account in the GPA.

Modeling carried out for test purposes and GPA exhibits approximately respectively 30 measured values and state values.

List of Reference Symbols 1 compressor
2 combustion chamber
3 turbine
PC compressor outlet pressure
TC compressor outlet temperature
PG turbine exhaust pressure
TG turbine exhaust temperature
F fuel mass flow
N rotational speed
M mechanical power or torque

What is claimed is:
1. A method for determining a degradation of a gas turbine, in which a set of measured values y is detected at a measuring instant and a state vector x characterizing the degradation of the gas turbine is calculated from this set of measured values, the method comprising:

forming subsets of the set of measured values y, and calculating a corresponding state vector x for each subset;

assigning each of the subsets and the corresponding state vector x to at least one of the measured values y when the subset does not include the at least one measured value y; and diagnosing as defective a measured value whose assigned state vector or assigned state vectors substantially deviates/deviate from state vectors not assigned to the measured value.

2. The method as claimed in claim 1, wherein in a nominal state of the gas turbine a nominal state vector $x_0$ results from nominal measured values $y_0$, and the method comprises:

calculating the state vector x for each subset of measured values by determining deviations dy of the measured values y from the nominal measured values $y_0$, and determining a deviation dx of the state vector x from the nominal state $x_0$ based on the deviations dy of the measured values y.

3. The method as claimed in claim 2, comprising:

calculating the measured values y from the state vector x using a function y=f(x), wherein the function y=f(x) is linearized in a nominal state x0 and a Jacobi matrix J is formed, and determining the deviation dx of the state vector x by multiplying an inverse $J^{-1}$ of the Jacobi matrix J by the deviations dy of the measured values y.

4. The method as claimed in claim 1, comprising:

determining the measured values y from the state vector x using a function y=f(x), and determining the state vector x from the measured values y iteratively using a numerical method with the aid of the function y=f(x).

5. The method as claimed in claim 2, comprising:

calculating the measured values y from the state vector x using a function y=f(x), and determining the deviation dx of the state vector x from the deviations dy of the measured values y iteratively using a numerical method with the aid of the function y=f(x).

6. The method as claimed in claim 1, wherein a measure $Q_k$ of the quality of a kth measured value is essentially determined in accordance with $$Q_Q = \frac{1}{m}\sum_{x=\Theta}^{T} \frac{\text{abs}(dx_x - dx_x(k))}{dx_x(k)}$$

m being a number of states or of elements of a vector $dx=(dx_{12}, dx_2, \ldots dx_m)$ of deviations of an estimated state x from a nominal state $x_0$, the vector dx being determined taking account of the kth measured value, and the vector dx(k) being determined without taking account of the kth measured value.

7. The method as claimed in claim 1, wherein the set of measured values has measured values of an outlet pressure (PC) and an outlet temperature (TC) of a compressor, an exhaust pressure (PG) and an exhaust temperature (TG) of a turbine and at least one measured value of a mechanical power, a mechanical torque or a fuel mass flow of the gas turbine.

8. The method as claimed in claim 1, comprising:

forming the subsets of the measured values from the set of measured values y by cyclically omitting exactly one measured value.

9. A computer readable medium comprising a computer program for causing a computer to execute the method as claimed in claim 1.

* * * * *